United States Patent
Lisowski et al.

(10) Patent No.: US 11,213,065 B2
(45) Date of Patent: Jan. 4, 2022

(54) TRANSFERRING APPARATUS FOR TRANSFERRING AND METHOD FOR TRANSFERRING OF ROD-LIKE ARTICLES OF TOBACCO INDUSTRY, AND APPARATUS FOR CONVERSION OF CONFIGURATION OF A STREAM OF SUCH ARTICLES

(71) Applicant: International Tobacco Machinery Poland Sp. z o. o., Radom (PL)

(72) Inventors: Andrzej Lisowski, Radom (PL); Bartosz Cieślikowski, Radom (PL)

(73) Assignee: International Tobacco Machinery Poland Sp. z o. o., Radom (PL)

( * ) Notice: Subject to any disclaimer, the term of this patent is extended or adjusted under 35 U.S.C. 154(b) by 220 days.

(21) Appl. No.: 16/609,452

(22) PCT Filed: May 22, 2018

(86) PCT No.: PCT/IB2018/053595
§ 371 (c)(1),
(2) Date: Oct. 30, 2019

(87) PCT Pub. No.: WO2018/220472
PCT Pub. Date: Dec. 6, 2018

(65) Prior Publication Data
US 2020/0163374 A1    May 28, 2020

(30) Foreign Application Priority Data
May 29, 2017    (PL) .......................................... 421723

(51) Int. Cl.
*A24D 3/02*    (2006.01)
*B65G 29/02*    (2006.01)
*A24C 5/32*    (2006.01)

(52) U.S. Cl.
CPC ............ *A24D 3/0287* (2013.01); *A24C 5/327* (2013.01); *B65G 29/02* (2013.01)

(58) Field of Classification Search
None
See application file for complete search history.

(56) References Cited

U.S. PATENT DOCUMENTS 2,957,285 A    10/1960    Molins
3,267,820 A    8/1966    Molins
(Continued)

FOREIGN PATENT DOCUMENTS

CN    101744364 A    6/2010
CN    103010776 A    4/2013
(Continued)

OTHER PUBLICATIONS

International Search Report in PCT application No. PCT/IB2018/053595, dated Sep. 24, 2018, see IFW dated Oct. 30, 2019.
(Continued)

*Primary Examiner* — Timothy Kennedy
*Assistant Examiner* — Guy F Mongelli
(74) *Attorney, Agent, or Firm* — Oppedahl Patent Law Firm LLC (57) ABSTRACT

The object of the application is a transferring apparatus (1) for transferring of a stream of rod-like articles (40) from an apparatus (100) feeding rod-like articles to an apparatus (200) receiving the rod-like articles in the machines of the tobacco industry, whereas in the feeding apparatus (100) the rod-like articles (40) are conveyed in a first stream (S1) of rod-like articles in which the rod-like articles are arranged in a first configuration, and in the receiving apparatus (200) the rod-like articles (40) are conveyed in a second stream (S2) of rod-like articles in which the rod-like articles (40) are arranged in a second configuration, comprising: a transfer-
(Continued)

ring wheel (30); non-slidable lugs (33) situated on the circumference of the transferring wheel (30); a guiding surface (34) to guide the rod-like article, the rod-like articles being conveyed axially, tangentially to the guiding surface (34); characterised by having a slidable lug (22) being slidable relative to the circumference of the transferring wheel (30) by means of a drive mechanism (10) so that the said slidable lug (22) varies its position relative to an adjacent non-slidable lug (33).

15 Claims, 8 Drawing Sheets

(56) References Cited

U.S. PATENT DOCUMENTS

| | | |
|---|---|---|
| 3,357,320 A | 12/1967 | Sexstone et al. |
| 4,063,480 A | 12/1977 | Hinzmann |
| 4,185,941 A | 1/1980 | Molins |
| 5,067,634 A | 11/1991 | Guindulain |
| 2017/0360083 A1* | 12/2017 | Cieslikowski ......... B65G 29/02 |

FOREIGN PATENT DOCUMENTS

| | | |
|---|---|---|
| CN | 103144953 A | 6/2013 |
| CN | 106347982 A | 1/2017 |
| EP | 1767107 A1 | 3/2007 |
| EP | 3117722 A1 | 1/2017 |
| FR | 2358844 A1 | 2/1978 |
| WO | 2009/074540 A1 | 6/2009 |
| WO | WO2012175467 A1 | 12/2012 |
| WO | WO2015134041 A1 | 9/2015 |

OTHER PUBLICATIONS

Written Opinion of the International Searching Authority in PCT application No. PCT/IB2018/053595, dated Sep. 24, 2018, see IFW dated Oct. 30, 2019.

* cited by examiner

TRANSFERRING APPARATUS FOR TRANSFERRING AND METHOD FOR TRANSFERRING OF ROD-LIKE ARTICLES OF TOBACCO INDUSTRY, AND APPARATUS FOR CONVERSION OF CONFIGURATION OF A STREAM OF SUCH ARTICLES

The object of the invention is a transferring apparatus for transferring and a method for transferring of rod-like articles of the tobacco industry, and an apparatus for conversion of configuration of a stream of such articles.

In the tobacco industry machines, various kinds of rod-like articles such as non-filter cigarettes, filter cigarettes, cigarillos, filter rods made of one kind of material, multi-segment filter rods, cigars etc. are manufactured. The semi-finished products manufactured at individual production stages are also referred to as rod-like articles. The rod-like articles may be transferred in a mass flow in which the relative position of the articles being transferred is random and variable, however, a part of the machines requires transferring of rod-like articles in streams of individual articles in which the position of neighbouring articles relative to one another is defined. It is possible to transfer the rod-like articles successively one after another so that the axes of the rod-like articles are parallel to the transferring direction, which means that the articles are transferred coaxially. It is possible to transfer the articles one after another so that the axes of the articles are situated transversely to the conveying direction, with the axes of the articles being situated parallel to one another. The distances between the segments and the possibility to transfer the segments in groups or independently of one another may be defined. In view of different production line configurations it is also needed to transfer the articles among the streams, whereas the configuration in the streams may be different for each stream.

Multi-segment filter rods are an example of a rod-like article which is composed of a plurality of rod-like articles. The multi-segment filter rods consist of segments made of various kinds of filter materials. Before manufacturing multi-segment rods, the filter rods containing a filter material of one kind are cut into a plurality of short filter segments. The filter segments made of different materials are placed in an appropriate order maintaining defined distances between the segments in order to ultimately manufacture multi-segment rods in successive operations, whereas in a finished rod the segments may abut or there may be distances left between the segments. An apparatus for the manufacture of multi-segment filter rods is known from the patent EP2230951B1, whereas in that apparatus several streams of rod-like articles with different configurations may be indicated. The rods made of a filter material of one kind are cut into segments which are conveyed in the form of a first stream in which the segments move axially one after another. The segments are fed one by one from the stream by means of a separating cam to a transferring apparatus comprising a transferring wheel provided with lugs which transfers the segments onto a belt conveyor. A segment stream forming unit together with the separating cam designed to separate individual segments constitute a feeding apparatus designed to feed the segments to the transferring apparatus, whereas the configuration of the stream from which the separating cam pulls out the segments, one at a time, is such that the segments move coaxially one after another and remain in contact with one another. The segments are transferred downwards by means of a transferring wheel with lugs onto the belt conveyor which, in the segment receiving area, is U-shaped in cross-section. The belt conveyor constitutes a receiving apparatus on which a second stream of segments with a configuration different from the first stream is formed. The stream configuration on the belt conveyor is such that the segments move coaxially at distances, whereas the segments may move at equal distances or the segments may be spaced so that the distances between the segments may have two different values, i.e. may be alternately the same. The patent EP2230951B1 has disclosed a transferring disc of a transferring apparatus on which the lugs are arranged uniformly and are used to place the segments at equal distances on the belt conveyor. The patent EP2230951B1 has also disclosed a transferring disc on which the lugs are arranged non-uniformly and are used to place the segments at alternately the same distances on the belt conveyor.

The segments are transferred from the first segment stream uniformly to a place from which they are taken by a lug of the transferring disc. In the case of non-uniform feeding of the segments and placing of the segments at different distances on the belt conveyor every second segment is taken immediately after feeding it to the place from which it is taken by a lug of the transferring disc, and every second segment waits at this place to be taken, which means that a certain time passes between segment feeding and segment being taken by a lug of the transferring disc. A problem occurs in the case of feeding of very short segments because, when separating short segments from the segment stream, as a result of mutual friction of neighbouring segments the short segments may rotate in an uncontrolled manner. Furthermore, it may happen that segments which are taken with a delay may also rotate in an uncontrolled manner because the guiding surfaces on which the articles are guided are movable, and the segments are not held on all sides. As a result, short segments may be transferred and placed on the belt conveyor in an uncontrolled position, in consequence of which a defective rod will be manufactured. The control system should detect such rod and it should be rejected from the production. However, a part of the rods with turned segments is not detected and defective filter tips made of them are attached to cigarettes. Such defective cigarettes may get to customers.

This invention solves the problem of developing an apparatus for the transferring of rod-like articles and an apparatus for the conversion of configuration of a stream of rod-like articles where such apparatuses will eliminate the risk of manufacture of defective rods. This task concerns in particular such rods whose manufacturing requires placing short segments at different distances on the conveyor.

The object of the invention is a transferring apparatus for transferring of a stream of rod-like articles from an apparatus feeding the rod-like articles to an apparatus receiving the rod-like articles in machines of the tobacco industry. In the feeding apparatus the rod-like articles are conveyed in a first stream of rod-like articles in which the rod-like articles are arranged in a first configuration, and in the receiving apparatus the rod-like articles are conveyed in a second stream of rod-like articles in which the rod-like articles are arranged in a second configuration. The apparatus according to the invention comprises a transferring wheel, non-slidable lugs situated on the circumference of the transferring wheel, and a guiding surface to guide the rod-like article. The rod-like articles are conveyed axially, tangentially to the guiding surface. The apparatus according to the invention is characterised by having a slidable lug being slidable relative to the circumference of the transferring wheel by means of a drive mechanism so that the said slidable lug varies its position relative to an adjacent non-slidable lug.

The apparatus according to the invention is further characterised in that the slidable lug is attached to an arm being rotatably attached on the axis of rotation of the transferring wheel.

The apparatus according to the invention is further characterised in that the slidable lug is attached to an arm being attached rotatably eccentrically relative to the axis of rotation of the transferring wheel.

The apparatus according to the invention is characterised in that the rotary drive mechanism is rotatably or slidably coupled with the arm of the lug at a coupling point, whereas the distance of the coupling point from the axis of rotation of the drive mechanism cyclically varies during rotation of the drive mechanism.

The apparatus according to the invention is characterised in that the drive mechanism is provided with a drive disc having a guiding groove engaged with a coupling mandrel attached to the arm.

The apparatus according to the invention is characterised in that the drive disc is attached eccentrically relative to the axis of rotation of the transferring wheel.

The apparatus according to the invention is characterised by having at least two slidable lugs and at least two non-slidable lugs arranged alternately.

The apparatus according to the invention is characterised in that the guiding surface is the circumferential surface of the transferring wheel.

The apparatus according to the invention is characterised in that the guiding surface is a cylindrical surface situated above the circumferential surface of the transferring wheel.

The object of the invention is further an apparatus for the conversion of configuration of a stream of rod-like articles in the machines of the tobacco industry comprising: an apparatus feeding the rod-like articles in which a first stream of the rod-like articles is conveyed and from which the rod-like articles are fed to a transferring apparatus, whereas the rod-like articles in the first stream are arranged in a first configuration. It further comprises a transferring apparatus for the transferring of the rod-like articles according to the invention, whereas the rod-like articles are transferred to a receiving apparatus; and a receiving apparatus for receiving the rod-like articles in which a second stream of the rod-like articles is conveyed, whereas the rod-like articles in the second stream are arranged in a second configuration.

The apparatus according to the invention is characterised in that the feeding apparatus is provided with a separating cam designed to feed the rod-like articles and situated in a plane perpendicular to the transferring plane.

The apparatus according to the invention is further characterised in that the feeding apparatus has a feeding wheel designed to feed the rod-like articles and situated in a plane perpendicular to the transferring plane.

The apparatus according to the invention is further characterised in that the receiving apparatus is a belt conveyor.

The object of the invention is further a method for transferring of a rod-like article from an apparatus feeding rod-like article to an apparatus receiving the rod-like article by means of a transferring apparatus provided with a transferring wheel and with lugs wherein the rod-like articles are fed from the feeding apparatus to the transferring apparatus, the rod-like articles are conveyed in the transferring apparatus, giving input distances between the rod-like articles in the transferring apparatus, the rod-like articles are transferred from the transferring apparatus to the receiving apparatus keeping the input distances of the transferring apparatus between the successive rod-like articles. The method according to the invention is characterised in that during conveying of the rod-like articles in the transferring apparatus the rod-like articles are shifted relative to one another so that the input distances between the successive rod-like articles are varied to the output distances by changing the relative position of the adjacent lugs in the conveying apparatus.

The method according to the invention is characterised in that the input distances are uniform, and the output distances are alternately uniform.

The invention introduces an advantageous method for controlling the distances between the sequences which may be easily used in existing production lines without the need of introducing a new unit in the line. The method according to the invention allows controlling the distances while using a high speed of transfer of the rod-like articles.

The object of the invention was shown in detail in a preferred embodiment in a drawing in which.

Figure 1:
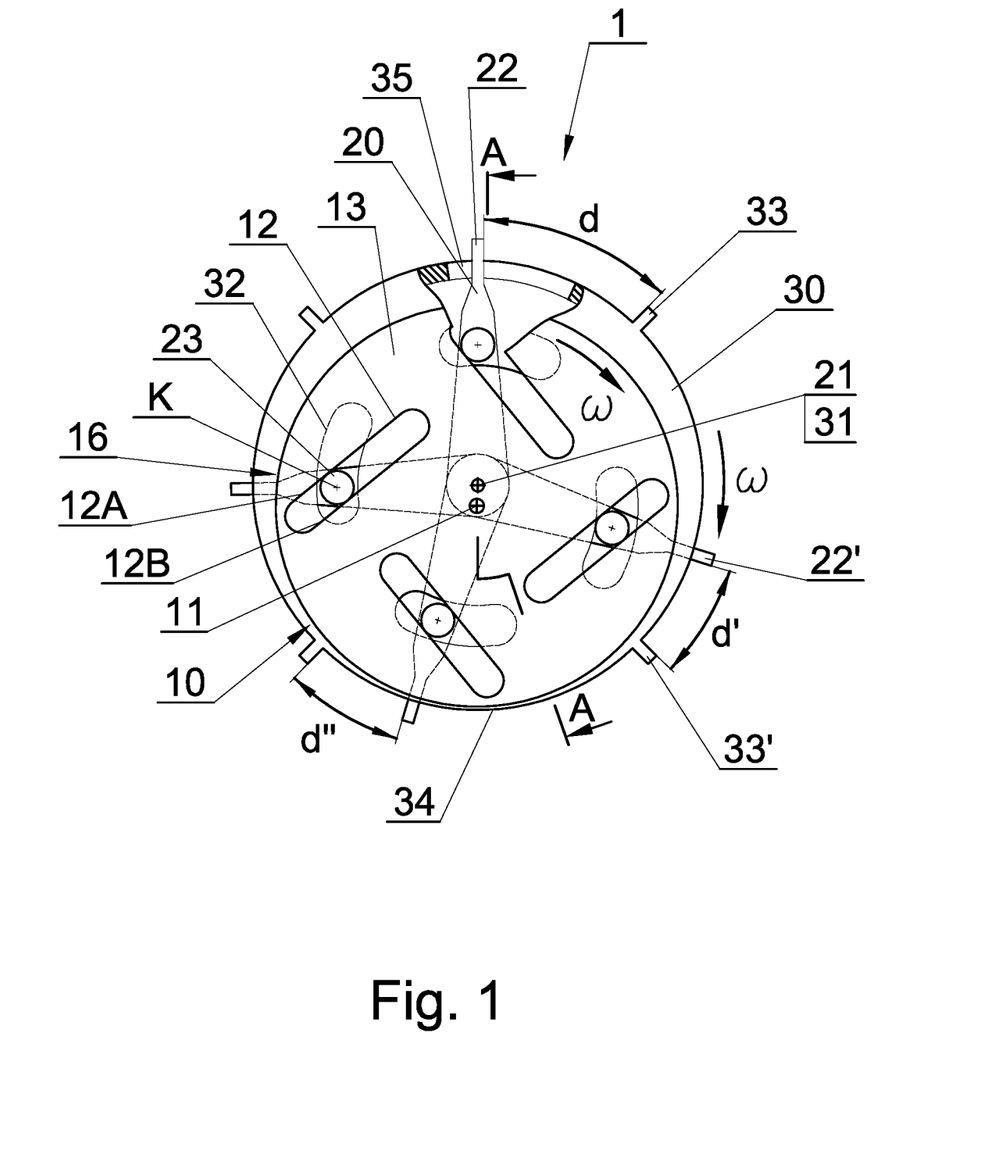
FIG. 1 shows a transferring apparatus in a first embodiment.
Figure 2:
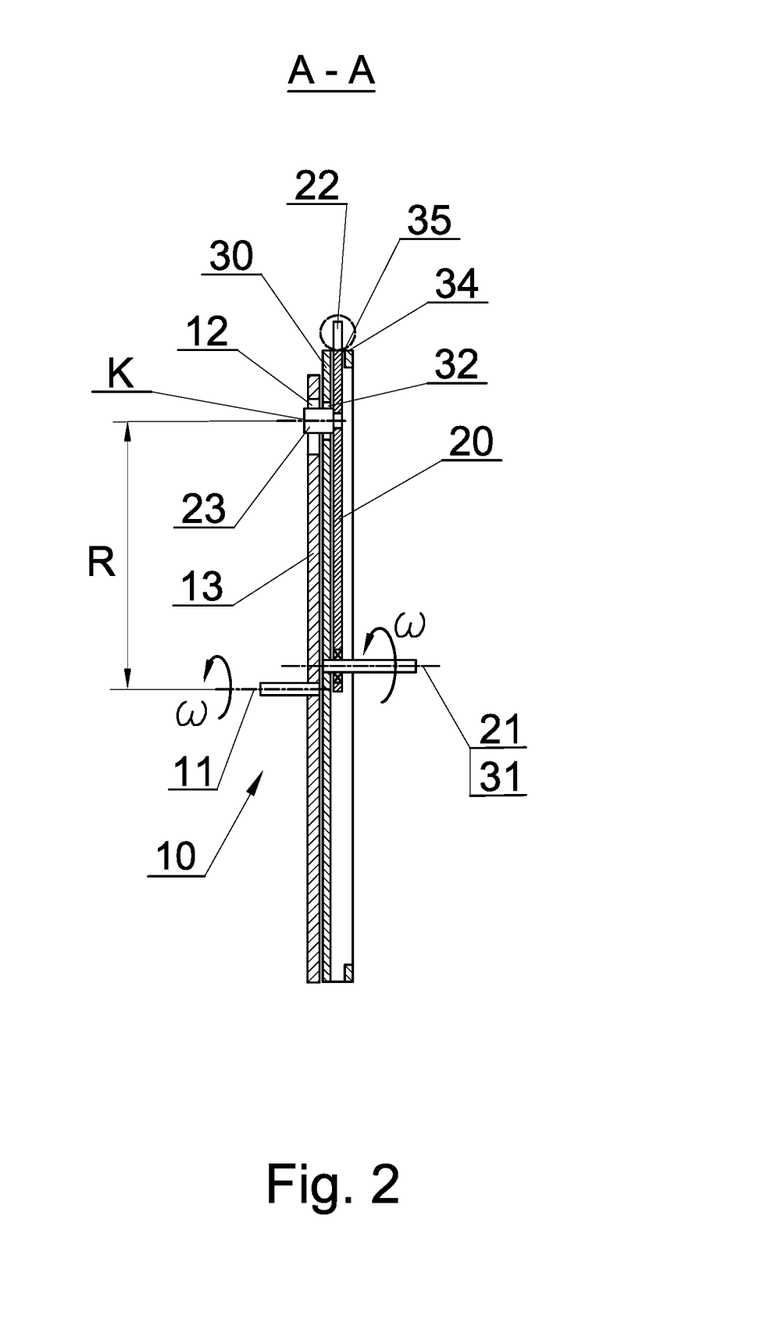
FIG. 2 shows a cross-section through the apparatus of FIG. 1.

FIGS. 1 and 2 show a first embodiment of a transferring apparatus according to the invention. The transferring apparatus 1 according to the invention has the form of a unit comprising a transferring wheel 30, non-slidable lugs 33, 33' immobile relative to the transferring wheel, slidable lugs 22, 22' movable relative to the transferring wheel, and a drive mechanism 10 adapted to vary the position of the slidable lugs. The non-slidable lugs 33, 33', immobile relative to the guiding surface 34, are situated on the circumference of the transferring wheel 30. The non-slidable lugs 33, 33' may constitute a part of the transferring wheel 30. The lugs 22, 22', 33, 33' are used to take the rod-like articles of the tobacco industry, for example the filter segments, and convey them on a circular path during the rotation of the transferring wheel 30. The rod-like articles are conveyed on a guiding surface 34 being the circumferential surface of the transferring wheel 30. The transferring apparatus 1 is provided with the slidable lugs 22 which are not connected with the guiding surface 34 and may slide relative to the guiding surface 34. The slidable lug 22 is attached to an arm 20 which is rotatably attached on the axis 21, for example to a bearing. In the guiding surface 34 of the transferring wheel 30 there is a lengthwise cut-out 35 through which the arm 20 protrudes so that the slidable lug 22 is situated above the guiding surface 34. A coupling mandrel 23 is rotatably attached to the arm 20. The coupling mandrel 23 is adapted to move along a guiding groove 12 in a drive disc 13 of a drive mechanism 10 and in a through hole 32 in the transferring wheel, whereas the axis of rotation 11 of the drive disc 13 is situated eccentrically relative to the transferring wheel 30, i.e. relative to the axis 31. The rotational movement of the drive disc 13 of the drive mechanism 10 takes place with a rotational speed ω equal to the rotational speed of the transferring wheel 30. The drive disc 13 may be attached in the axis 11 by means of a bearing or to a shaft. The drive mechanism 10 is rotatably and/or slidably coupled at the coupling point K with at least one arm 20 to which the slidable lug 22 is attached. The arms 20 provided with the slidable lugs 22 and the transferring wheel 30 are rotatably attached so that the axis of rotation 21 of the arms 20 and the axis of rotation 31 of the transferring wheel 30 overlap, while the drive disc 13 of the drive mechanism 10 is rotatably attached so that its axis of rotation 11 does not overlap the axis of rotation 31 of the transferring wheel 30 and the axis of rotation 21 of the arms 20. The eccentric attachment of the drive disc 13 of the drive mechanism 10 and the configuration of the coupling unit 16 adapted to couple the arms 20 with the drive mechanism 10 as well as the fact of mechanical coupling of the drive mechanism 10 and the arms 20 with the slidable lugs 22 by means of the coupling mandrel 23 cause cyclical variations of position of the slidable lug 22 relative to the adjacent non-slidable lug 33.

The coupling unit 16 comprises the guiding groove 12 in the drive disc 13 of the drive mechanism 10 and the coupling mandrel 23 attached to the arm 20. The transferring wheel 30 is provided with the through hole 32 enabling the coupling mandrel 23 to pass from the arm 20 operating inside the transferring wheel 30 to the drive disc 13 of the drive mechanism 10 situated outside the transferring wheel 30. The effect of sliding of the slidable lugs 22 on the circumference of the transferring wheel 30 results from the transformation of the movement in radial direction of the coupling mandrel 23 relative to the axis of rotation 11 of the drive mechanism 10 resulting from the eccentric attachment of the drive mechanism 10 relative to the axis of rotation 21 of the arms 20 into a movement with a tangential component of the coupling mandrel 23 relative to the axis of rotation 21 of the arms 20. Such transformation is caused by an appropriate configuration of the grooves 12 of the coupling unit 16 which guide the coupling mandrel 23. The appropriate configuration of the coupling unit 16 consists in selecting the shape of the grooves 12, their position and angular orientation relative to both axes of rotation 11, 21. In the embodiment shown, the grooves 12 are rectilinear grooves, whereas they may have the form of arched grooves. As a result, the slidable lugs 22 move during the operation of the transferring apparatus 1 with a variable rotational speed, while the non-slidable lugs 33 move with a constant rotational speed of the transferring wheel 30.

The coupling of the drive disc 13 of the drive mechanism 10 with the arm 20 by means of the coupling mandrel 23 ensures the power transmission from the drive disc 13 of the drive mechanism 10 to the arm 20. The rotational movement of the drive disc 13 of the drive mechanism 10 forces the rotational movement of the arms 20 and the slidable lugs 22. The coupling of the drive disc 13 of the drive mechanism 10 is slidable due to the movement of the coupling mandrel 23 in the groove 12 and rotatable due to the relative rotational movement of the arm 20 and the drive disc 13 of the drive mechanism 10. The coupling mandrel 23 may be rotatably attached to the arm 20, may have the form of a roller and may roll along the wall 12A or 12B of the groove 12, whereas such solution where the coupling mandrel 23 is not rotatably attached the arm 20, but rotates relative to the groove 12, is also possible.

In the drive mechanism 10, the coupling point K of the drive disc 13 of the drive mechanism 10 and the arm 20 lying in the axis of the coupling mandrel 23 may be distinguished. The distance between the coupling point K and the axis of rotation 11 of the drive disc 13 of the drive mechanism 10 is variable during the rotational movement of the transferring apparatus 1. During the rotation of the drive disc 13 of the drive mechanism 10, due to the eccentric situation of the drive disc 13 and the arms 20, the position of the coupling mandrel 23 in the guiding groove 12 varies. This variation involves an alteration of the distance of the coupling point K from the axis of rotation 11 of the drive disc 13 marked as R in FIG. 2. In connection with the movement of the coupling mandrel 23 in the groove 12, the position of the slidable lug 22' relative to the non-slidable lug 33' being adjacent to the slidable lug 22' also varies (FIG. 1).

During the movement of the mechanisms of the transferring apparatus 2, the coupling mandrel 23 moves along the guiding groove 12, which forces a variation of position of the slidable lug 22 relative to the non-slidable lug 33. The original angular distance d between the non-slidable lug 33 and the slidable lug 22 is marked in FIG. 1. The first lugs 33, 22, after making a part of the rotation, will be in the same position as the second lugs 33', 22', and the angular distance d' between them is smaller than the original distance d. The angular distance between the lugs 33, 22 varies in the course of rotation of the transferring apparatus. In the course of further rotation, the roller of the coupling mandrel 23 moves further along the guiding groove 12, and the distance between the slidable lug 22' and the non-slidable lug 33' decreases. In the course of further rotation, after achieving the minimum angular distance d" between the adjacent lugs 33 and 22, the coupling mandrel 23 moves in the guiding groove 12 in the opposite direction to the previous direction, which forces a variation of position of the slidable lug 22 so that the angular distance between the slidable lug 22 and the non-slidable lug 33 increases. During the rotation of the transferring apparatus 1, there occurs a cyclical variation of angular distance between the slidable lugs 22 and the non-slidable lugs 33. The transferring apparatus 1 may have one non-slidable lug 33 and one slidable lug 22, whereas in a preferred solution there is an even number of the non-slidable lugs 33 and the slidable lugs 22, with the lugs being alternately arranged.

Figure 3:
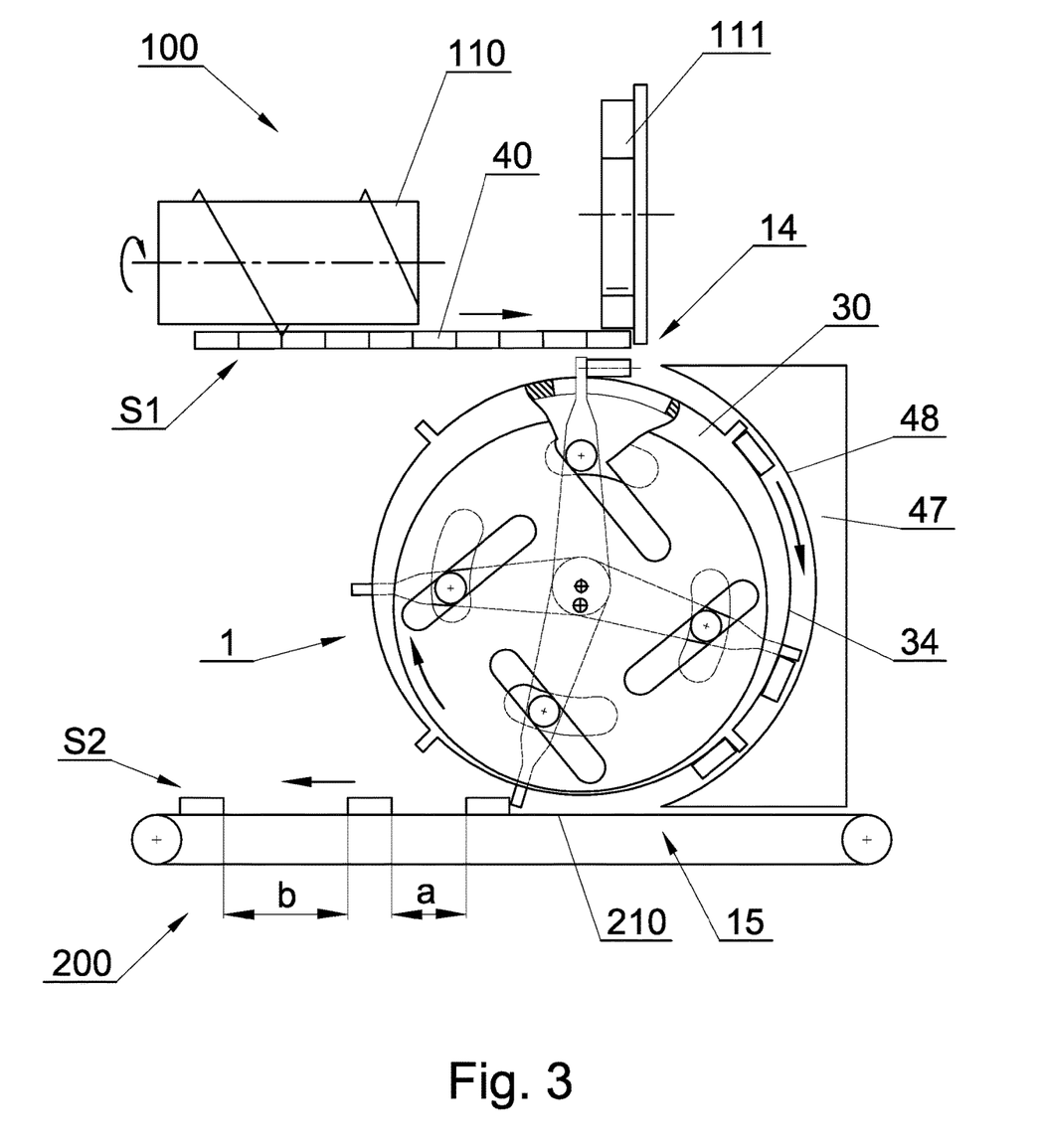
FIG. 3 shows an apparatus for the conversion of configuration in a first embodiment.

FIG. 3 shows an embodiment of the transferring apparatus in a conveying system of the tobacco industry. The transferring apparatus 1 shown in FIG. 1 is situated between the feeding apparatus 100 in which the segments are conveyed in the first stream S1 and the receiving apparatus 200 in which the segments are conveyed in the second stream S2. The feeding apparatus 100, the transferring apparatus 1 and the receiving apparatus 200 form an apparatus for the conversion of stream configuration in the first embodiment.

In the border area between the feeding apparatus 100 and the transferring apparatus 1 there is a feeding area 14 in which the segments 40 are transferred from the feeding apparatus 100 to the transferring apparatus 1. The feeding apparatus 100 comprises a spiral rotary drum 110 for lengthwise feeding of the segments 40 in the first stream S1 and a separating cam 111 to separate an individual segment 40 and deliver such segment to the feeding area 14 (the operation of the spiral drum and the separating cam was described in detail in the patent EP2230951B1). The separating cam 111 may be replaced with another delivering element, for example with a delivering wheel situated perpendicular to the transferring plane. The segments 40 are delivered to the feeding area 14 at a uniform rate so that they can be received at equal distances. The distances between the successive segments in the feeding area 14 are the input distances at the transferring apparatus 1. After transferring to a transferring area 15 and to the receiving apparatus 200, the segments 40 are spaced at output distances different from the input distances. The length of the output distances varies alternately, with the sum of two consecutive input distances being equal to the sum of two consecutive output distances.

After placing the segment 40 in the feeding area 14, it is supported on the guiding surface 34. In the feeding area 14, there may be situated further guiding surfaces which keep the segment 40 in the proper position, i.e. tangentially to the guiding surface 34. FIG. 3 shows a guide 47 whose task is to form a channel for the segments 40 between the transferring surface 34 and the guiding surface 48.

In the border area between the transferring apparatus 1 and the receiving apparatus 200 there is a receiving area 15 in which the segments 40 are received by the receiving apparatus 200. The receiving apparatus 200 comprises a belt conveyor 210 on which the segments 40 move linearly, whereas the belt of the belt conveyor may be U-shaped only in the receiving area or at the full length at which the segments 40 are conveyed.

The configuration of the first stream S1 in the feeding apparatus 100 is such that the segments 40 are fed axially one after another and touch one another. In the receiving apparatus 200, the segments 40 move in the second stream S2. In the configuration of the second stream S2, the segments 40 are fed axially one after another in the conveying direction, they do not abut and are alternately arranged at the distance a or b. A variation of configuration of the segment stream from S1 to S2 is made by means of the transferring apparatus 1 according to the invention.

In the embodiment of the apparatus according to the invention shown, the segments 40 are transferred in such a way that from the segment stream S1 in the first configuration wherein the segments 40 are spaced at equal distances the segment stream S2 in the second configuration wherein the segments 40 are spaced at different distances is formed. A reverse conversion of arrangement configuration of the segments 40 in the streams is also possible, i.e. from a stream with a non-uniform segment arrangement a stream with a uniform segment arrangement may be formed.

Figure 4:
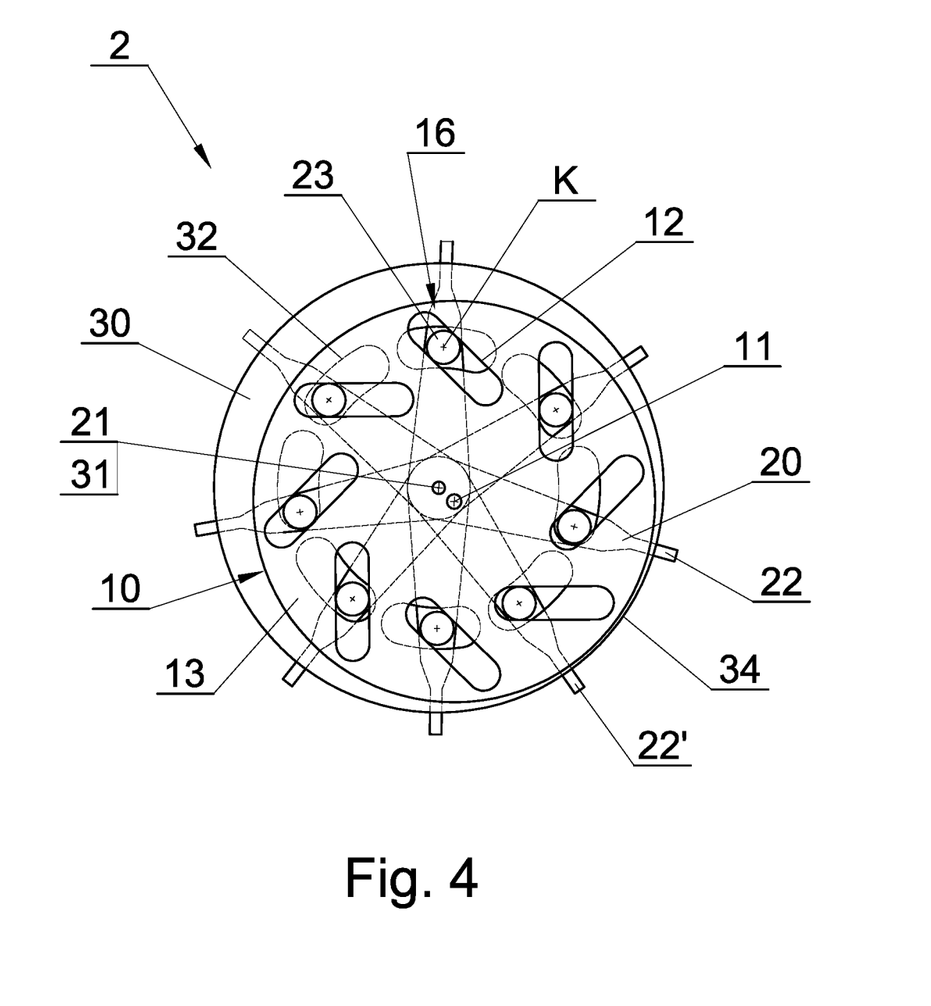
FIG. 4 shows the transferring apparatus in a second embodiment.

FIG. 4 shows a second embodiment of the transferring apparatus 2 according to the invention. The transferring apparatus 2 has the form of a transferring wheel unit having a guiding wheel 30 with a guiding surface 34 on which the rod-like articles of the tobacco industry are guided. The transferring apparatus 2 comprises a drive mechanism 10 rotatably and/or slidably coupled with at least one arm 20 at the coupling point K. The transferring wheel has the through holes 32 through which the coupling mandrels 23 pass. Similar to the first embodiment, the coupling unit 16 couples the drive disc 13 of the drive mechanism 10 with the arm 20 by means of the coupling mandrel 23. In the second embodiment, the transferring apparatus 2 comprises eight arms 20, provided with the lugs 22, 22'. In the second embodiment, the movement of the slidable lugs 22, 22' on the circumference of the transferring wheel 30 causes a continuous variation of the distance between the slidable lugs 22, 22'. Also in this embodiment, the range of the variation of position of the slidable lugs 22, 22' may be adjusted by selecting relevant geometrical parameters of the coupling unit.

Figure 5:
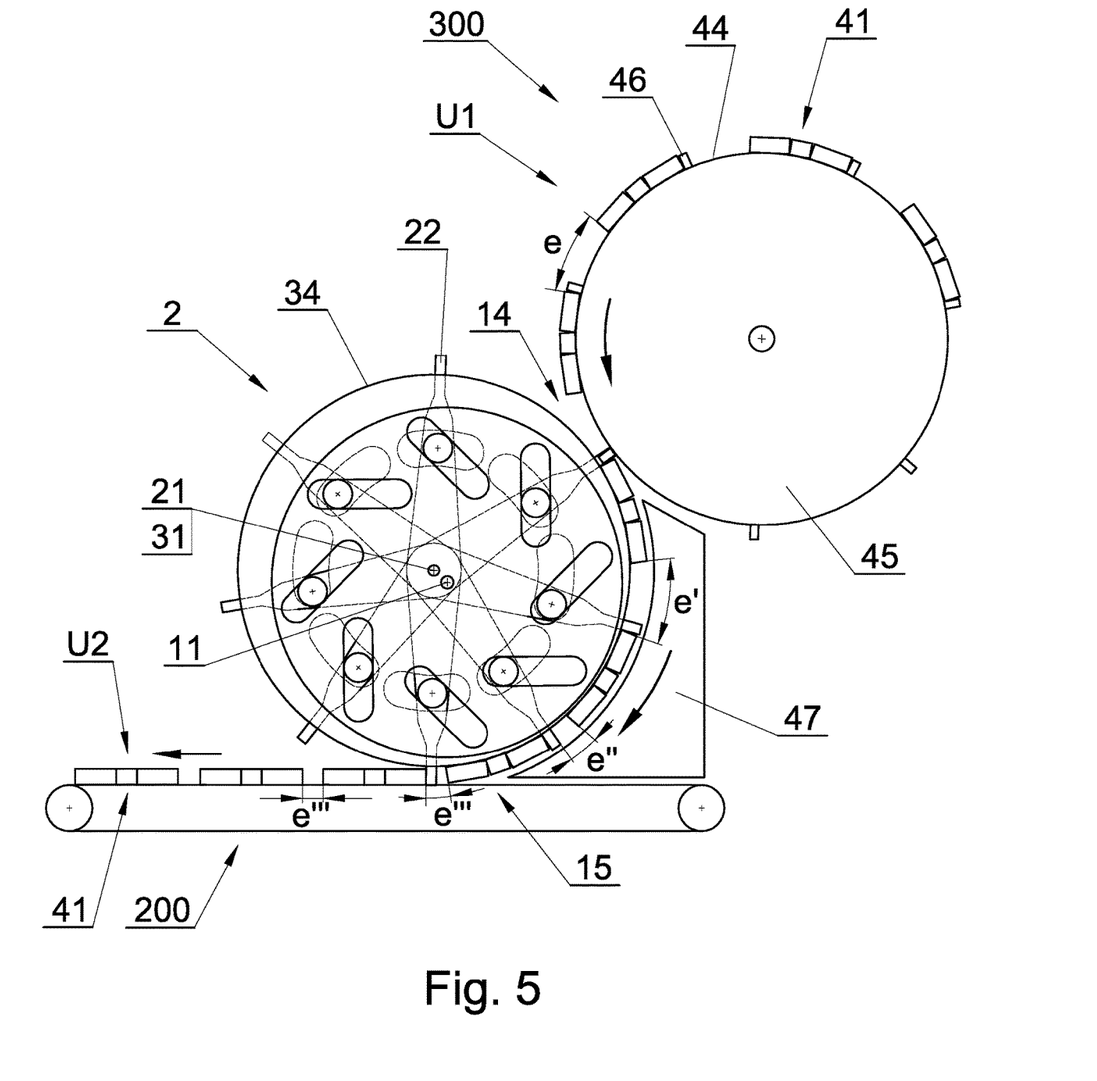
FIG. 5 shows the apparatus for the conversion of configuration of the stream in a second embodiment.

In the second embodiment of the apparatus for the conversion of stream configuration shown in FIG. 5, the transferring apparatus 2 is adapted to convey and change the stream U1 of the rod-like articles from the feeding apparatus 300 into the stream U2 of the rod-like articles fed to the receiving apparatus 200. The rod-like articles are in this case filter segments. The stream U1 is formed by the segment groups 41, whereas the successive segment groups 41 are situated at the distance e from one another. The stream U2 is formed from the segment groups 41, whereas between the segment groups 41 the distance e", smaller than the distance e, is maintained. The feeding apparatus 300 is adapted to convey the segments on a circular, generally arched path. The segment groups 41 are situated on the circumferential surface 44 of the wheel 45 and are conveyed on the path of movement by means of the uniformly spaced lugs 46. The segment groups 41 are fed to the transferring apparatus 1 in the feeding area 14. The transferring apparatus 1 is provided with the lugs of one kind, namely with the slidable lugs 22 being slidable relative to the guiding surface 34. During the transferring of the segment groups 41 in the transferring apparatus 1, the distance between the adjacent segment groups 41 is reduced from the value e via the values e', e" down to e'" decreasing due to the variation of position of the adjacent slidable lugs 22. The segment groups 41 at the distances e'" are transferred to the receiving apparatus 200 in the receiving area 15. The receiving apparatus 200 is adapted to convey the segments in the stream U2 on a linear path while keeping the distances e'" between the segment groups 41. The apparatus comprising the feeding apparatus 300, the transferring apparatus 2 and the receiving apparatus 200 is an apparatus for the conversion of stream configuration of the segment groups 41 conveyed on an arc with distances for the stream configuration of the segment groups 41 in the linear movement with smaller distances between the segment groups 41. In the embodiment shown in FIG. 5, the transferring apparatus 2 works with a guide 47 which forms a channel for the transferred segment groups 41.

Figure 6:
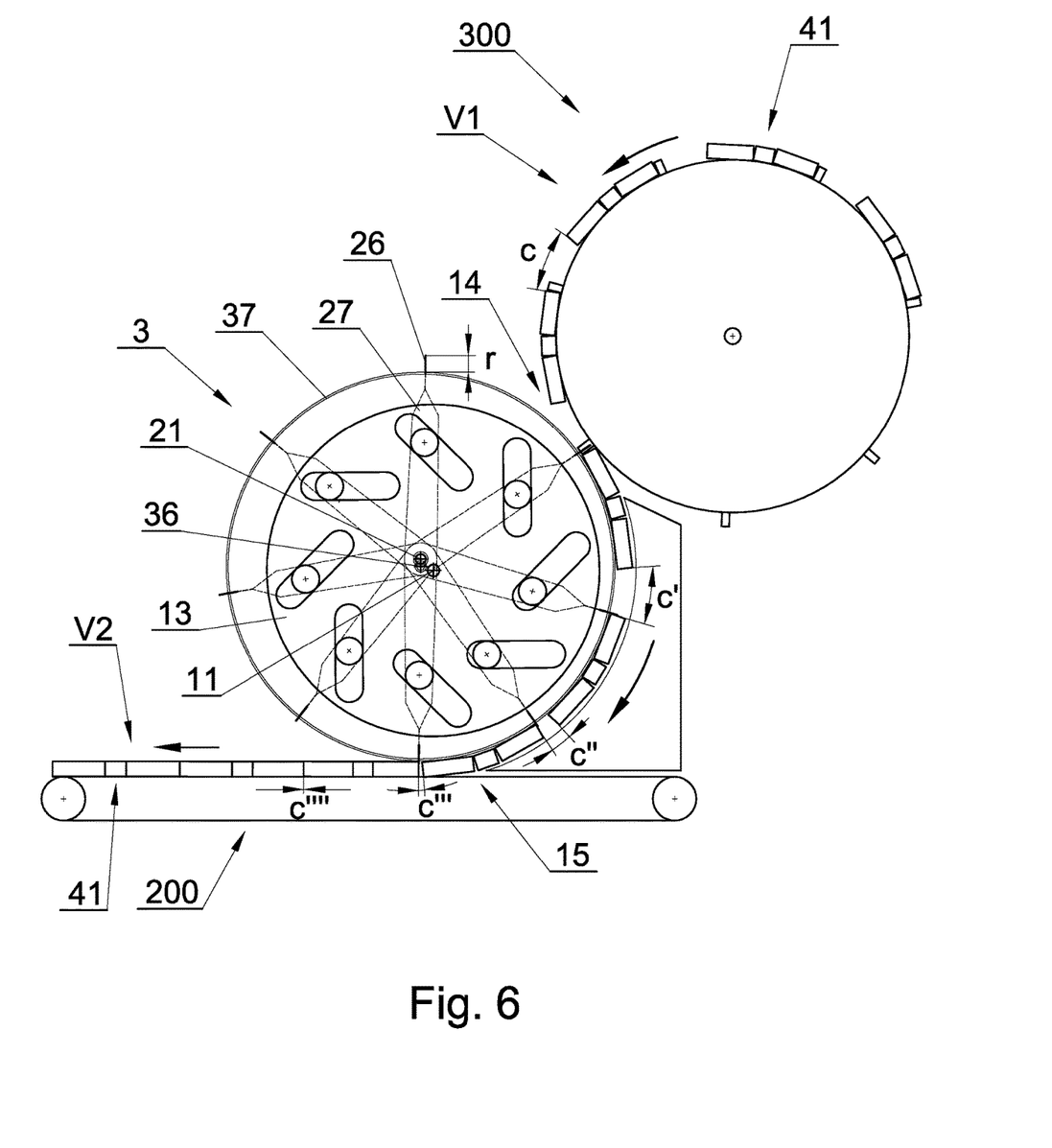
FIG. 6 shows the apparatus for the conversion of configuration of the stream in a third embodiment.

FIG. 6 presents an apparatus for the conversion of stream configuration in a third embodiment comprising the feeding apparatus 300, the transferring apparatus 3 and the receiving apparatus 200. In the third embodiment, the transferring apparatus 3 is adapted to convert the stream V1 of the segment groups 41 into the segment stream V2, whereas in the stream V2 there are no distances between the segments. The stream V1 is conveyed on a circular path. In the transferring apparatus 3, the slidable lugs 26 having a smaller thickness than the slidable lugs 22 in the previous embodiments are used, for example the slidable lugs 26 may be designed as steel plates. The guiding surface 37 is a cylindrical surface with the axis 36 situated eccentrically relative to the axis 21 on which the arms 27 with the slidable lugs 26 are rotatably attached. The guiding surface 37 may be stationary, then the segments will be conveyed by sliding on the guiding surface 37. The guiding surface 37 may be rotational with the axis of rotation 36, whereas the guiding surface 37 rotates with a rotational speed equal to the rotational speed of the drive disc 13. Due to the eccentric situation of the guiding surface 37, the slidable lugs 26 protrude above the guiding surface 37 to the height r which varies with the rotation of the slidable lugs 26 around the axis 21. For the slidable lug 26 being in the receiving area 15, the height r decreases to zero or to a value close to zero. Due to the fact that the height r drops to zero, it is possible to push the segment groups 41 close to one another. Pushing the segment groups 41 close to one another in the stream V2 is also possible when the slidable lugs 26 do not go completely below the guiding surface 37 while keeping the linear speed of the receiving apparatus 200 smaller than the speed of the slidable lugs 26. Similar to the previous embodiments, the arms 27 are attached on the axis 21, whereas the drive disc 13 is attached eccentrically on the axis 11. Similar to the previous embodiments, during the rotation of the transferring apparatus 3 there occurs a cyclical variation of distances between the adjacent slidable lugs 26, whereas such distance reaches the smallest value for the slidable lugs 26 being at the receiving area 15. In the course of conveying of the segment groups 41 in the transferring apparatus 3, the distance is reduced from the value c as in the stream V1, via the values c', c" and c'" decreasing due to the variation of position of the slidable lugs 26, with the distance c'" being slightly greater than the thickness of the slidable lugs 26, down to the value c"" equal to zero in the receiving apparatus 200. The linear speed of the belt conveyor in the receiving apparatus 200 may be equal to or smaller than the speed with which the slidable lugs 26 move. The configuration of the stream V2 is such that the segments are conveyed coaxially linearly one after another, the segments touching one another.

Figure 7:
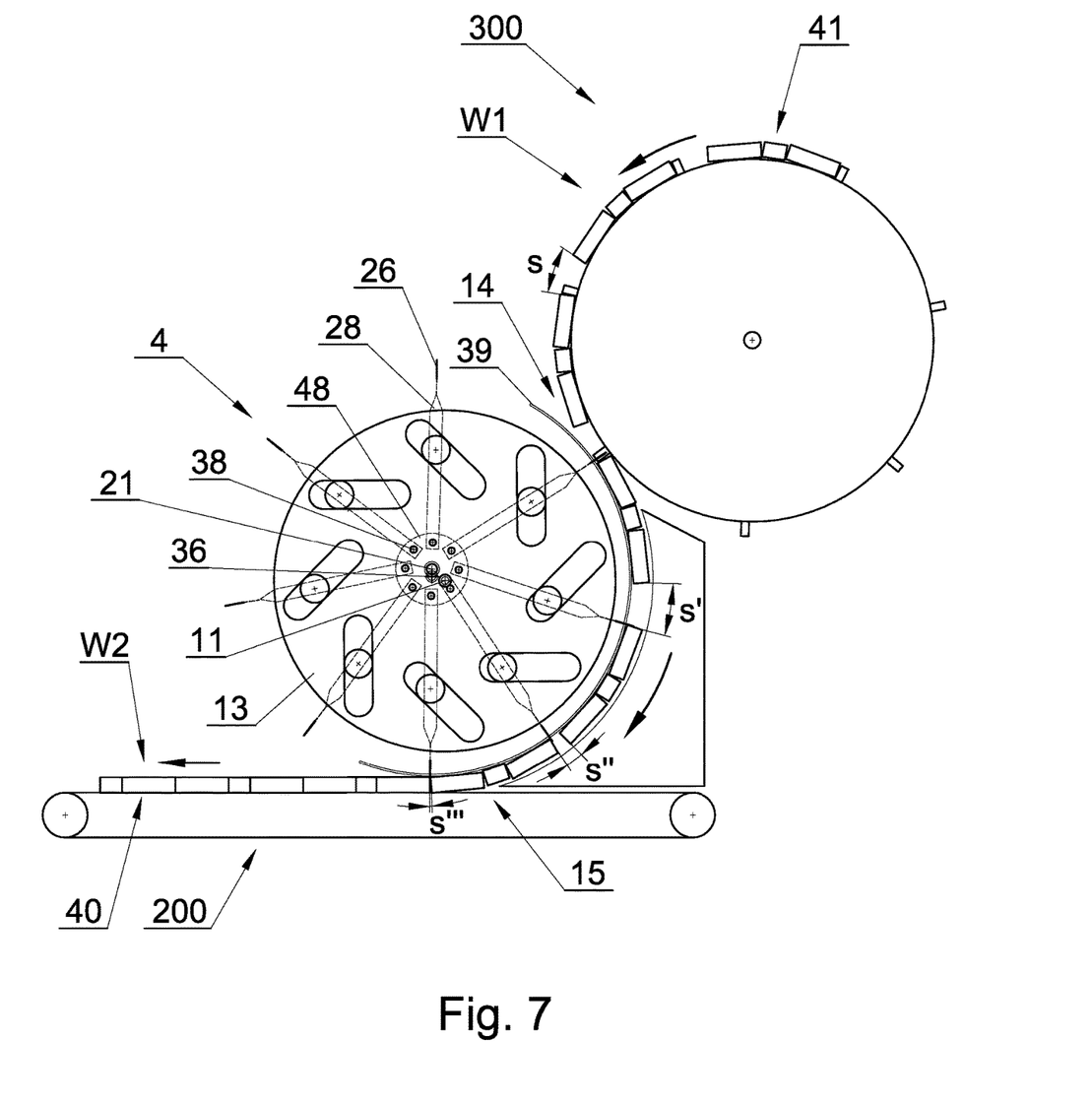
FIG. 7 shows the apparatus for the conversion of configuration of the stream in a fourth embodiment.

FIG. 7 presents an apparatus for the conversion of stream configuration in a fourth embodiment comprising the feeding apparatus 300, the transferring apparatus 4 and the receiving apparatus 200. In the fourth embodiment, the transferring apparatus 4 is adapted to convert the stream W1 of the segment groups 41 conveyed at distances s into the stream W2 of segments without distances. In the transferring apparatus 4, the lugs 26 like in the third embodiment are used, whereas the arms 28 to which the slidable lugs 26 are attached are fixed on a plurality of axes of rotation 38 arranged around the axis 21. The axes of rotation 38 may be arranged in the disc 48 rotatably attached on the axis 21. The stationary guiding surface 37' is a cylindrical surface or a cylindrical surface sector with the axis 36 situated eccentrically relative to the axis 21. The segment groups 41 are conveyed by sliding on the guiding surface 39. The guiding surface 39 may have a circumferential cut-out in which the slidable lugs 26 move. Due to the eccentric arrangement of the guiding surface 39, the slidable lugs 26 protrude above the guiding surface 39 to a different height varying with the rotation of the slidable lugs 26. The slidable lug 26 being in the receiving area 15 does not protrude above the guiding surface 39. As a result, it is possible to push the segment groups 41 close to one another. The distances between the segment groups 41 decrease from the value s of the stream W1 via s' and s" due to a change in mutual position of the slidable lugs 26 down to the value s'" equal to zero. In the stream W1, the segments are conveyed in segment groups 41 on an arc, with the distances s being kept between the groups. The configuration of the stream W2 is such that the segments are conveyed coaxially linearly one after another, the segments abutting.

Figure 8:
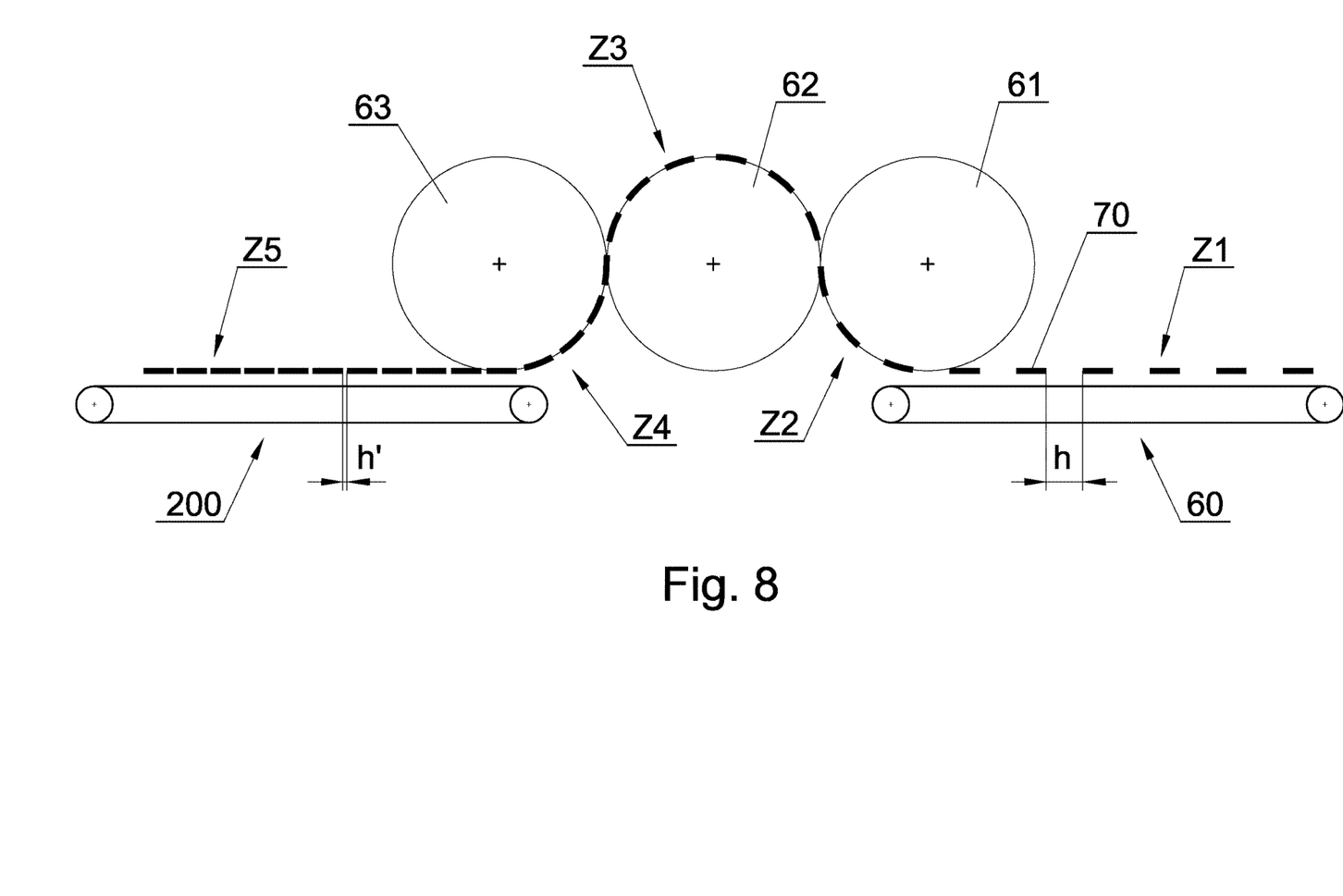
FIG. 8 shows the apparatus for the conversion of configuration of the stream in a fifth embodiment.

FIG. 8 shows an apparatus for the conversion of segment stream configuration comprising the feeding apparatus 60 to feed the segment groups 70 or individual segments, the transferring apparatuses 61, 62, 63 and the receiving apparatus 200. The input stream Z1 of the segment groups 70 or the individual segments has an input configuration in which the segment groups 70 or the individual segments are conveyed at defined distances h. The output stream Z5 has an output configuration in which the segment groups 70 or the individual segments are conveyed at defined distances h'. The transferring apparatuses 61, 62, 63 are used to convey the segments respectively in the streams Z2, Z3, Z4, whereas they may reduce the distances between the groups 70 or the segments or keep the distances of the preceding streams. The transferring apparatuses 61, 62, 63 may be designed according to one of the embodiments of the transferring apparatus 2, 3, 4.

The invention claimed is:

1. A transferring apparatus (1) for transferring of a stream of rod-like articles (40) from an apparatus (100) feeding rod-like articles to an apparatus (200) receiving the rod-like articles in the machines of the tobacco industry, whereas in the feeding apparatus (100) the rod-like articles (40) are conveyed in a first stream (S1) of rod-like articles in which the rod-like articles are arranged in a first configuration, and in the receiving apparatus (200) the rod-like articles (40) are conveyed in a second stream (S2) of rod-like articles in which the rod-like articles (40) are arranged in a second configuration, comprising:
a transferring wheel (30);
non-slidable lugs (33) situated on the circumference of the transferring wheel (30);
a guiding surface (34) to guide the rod-like article, the rod-like articles being conveyed axially, tangentially to the guiding surface (34);
characterised in that
the apparatus has a slidable lug (22) being slidable relative to the circumference of the transferring wheel (30) by means of a drive mechanism (10) so that the said slidable lug (22) varies its position relative to an adjacent non-slidable lug (33).

2. The apparatus as in claim 1 characterised in that the slidable lug (22) is attached to an arm (20) being rotatably attached on the axis of rotation (31) of the transferring wheel (30).

3. The apparatus as in claim 1 characterised in that the slidable lug (22) is attached to an arm (20) being attached rotatably eccentrically relative to the axis of rotation (31) of the transferring wheel (30).

4. The apparatus as in claim 1 characterised in that the rotary drive mechanism (10) is rotatably or slidably coupled with the arm (20) of the lug (22) at a coupling point (K), whereas the distance of the coupling point (K) from the axis of rotation (11) of the drive mechanism (10) cyclically varies during rotation of the drive mechanism (10).

5. The apparatus as in claim 4 characterised in that the drive mechanism (10) is provided with a drive disc (13) having a guiding groove (12) engaged with a coupling mandrel (23) attached to the arm (20).

6. The apparatus as in claim 5 characterised in that the drive disc (13) is attached eccentrically relative to the axis of rotation (31) of the transferring wheel (30).

7. The apparatus of claim 1 characterised by having at least two slidable lugs (22) and at least two non-slidable lugs (33) arranged alternately.

8. The apparatus of claim 1 characterised in that the guiding surface (34) is the circumferential surface of the transferring wheel (30).

9. The apparatus of claim 1 characterised in that the guiding surface (34) is a cylindrical surface situated above the circumferential surface of the transferring wheel (30).

10. The apparatus for the conversion of configuration of a stream of rod-like articles in the machines of the tobacco industry comprising:
an apparatus (100) feeding rod-like articles in which a first stream (S1) of rod-like articles is conveyed and from which the rod-like articles (40) are fed to a transferring apparatus (1), whereas the rod-like articles (40) in the first stream (S1) are arranged in a first configuration;
a transferring apparatus (1) for transferring of the rod-like articles according to claim 1, whereas the rod-like articles are transferred to a receiving apparatus (200); and a receiving apparatus (200) for receiving rod-like articles in which a second stream (S2) of rod-like articles is conveyed, whereas the rod-like articles (40) in the second stream (S2) are arranged in a second configuration.

11. The apparatus of claim 10 characterised in that the feeding apparatus (100) is provided with a separating cam (111) designed to feed the rod-like articles and situated in a plane perpendicular to the transferring plane.

12. The apparatus of claim 11 characterised in that the feeding apparatus (100) has a feeding wheel designed to feed the rod-like articles and situated in a plane perpendicular to the transferring plane.

13. The apparatus of claim 10 characterised in that the feeding apparatus (200) is a belt conveyor.

14. A method for transferring of a rod-like article from an apparatus (100) feeding the rod-like article to an apparatus (200) receiving the rod-like article by means of a transferring apparatus (1) provided with a transferring wheel (30) and with lugs (22, 33) wherein the rod-like articles are fed from the feeding apparatus to the transferring apparatus, the rod-like articles are conveyed in the transferring apparatus, setting input distances between the rod-like articles in the transferring apparatus, the rod-like articles are transferred from the transferring apparatus to the receiving apparatus keeping the input distances of the transferring apparatus between the successive rod-like articles, characterised in that during conveying of the rod-like articles in the transferring apparatus the rod-like articles are shifted relative to one another so that the input distances between the rod-like articles are varied to the output distances by changing the relative position of a slidable lug relative to an adjacent non-slidable lug in the conveying apparatus.

15. The method of claim 14 characterised in that the input distances are uniform, and the output distances are alternately uniform.

\* \* \* \* \*